US011707127B2

(12) United States Patent
Hattori

(10) Patent No.: US 11,707,127 B2
(45) Date of Patent: Jul. 25, 2023

(54) DIRECT LIQUID TYPE PEN-SHAPED EYELINER

(71) Applicant: CHEMICOS CREATIONS LTD., Tokyo (JP)

(72) Inventor: Katsutaka Hattori, Tokyo (JP)

(73) Assignee: CHEMICOS CREATIONS LTD., Tokyo (JP)

( * ) Notice: Subject to any disclaimer, the term of this patent is extended or adjusted under 35 U.S.C. 154(b) by 0 days.

(21) Appl. No.: 17/865,819

(22) Filed: Jul. 15, 2022

(65) Prior Publication Data

US 2022/0346525 A1 Nov. 3, 2022

Related U.S. Application Data

(63) Continuation of application No. PCT/JP2021/001243, filed on Jan. 15, 2021.

(30) Foreign Application Priority Data

Jan. 17, 2020 (JP) ................................ 2020-005640

(51) Int. Cl.

*A45D 34/04* (2006.01)
*B43K 5/18* (2006.01)
(Continued)

(52) U.S. Cl.

CPC ........ *A45D 34/042* (2013.01); *A45D 2200/05* (2013.01); *A45D 2200/1072* (2013.01);
(Continued)

(58) Field of Classification Search

CPC .......... A45D 34/042; A45D 2200/1072; A45D 2200/05; B43K 5/02; B43K 5/18;
(Continued)

(56) References Cited

U.S. PATENT DOCUMENTS 6,371,676 B1 * 4/2002 Furukawa ................ B43K 7/08 401/227
6,582,144 B1 * 6/2003 Matsumoto .............. B43K 5/18 401/229
(Continued)

FOREIGN PATENT DOCUMENTS

JP 59-125314 U 8/1984
JP 2003-11566 A 1/2003
(Continued)

OTHER PUBLICATIONS

International Search Report dated Apr. 6, 2021 issued by the International Searching Authority in counterpart International Application No. PCT/JP2021/001243 (PCT/ISA/210).
(Continued)

*Primary Examiner* — David J Walczak
(74) *Attorney, Agent, or Firm* — Sughrue Mion, PLLC

(57) ABSTRACT

A direct liquid type pen-shaped eyeliner capable of smoothly guiding and ejecting a coating material. A coating material feeder has a coating material discharge region positioned inside a hole portion of an application member and a coating material guide region positioned outside the hole portion and guiding a coating material in a coating material tank toward the coating material discharge region. An upper peripheral groove recessed from an outer peripheral surface toward an inside in a feeder radial direction as a radial direction of the coating material feeder, facing an inner peripheral surface of the hole portion, and allowing the coating material to flow in is formed of resin in the coating material discharge region.

9 Claims, 11 Drawing Sheets

(51) Int. Cl.
*B43K 8/02* (2006.01)
*B43K 8/04* (2006.01)

(52) U.S. Cl.
CPC ............ *B43K 5/1809* (2013.01); *B43K 8/026* (2013.01); *B43K 8/04* (2013.01)

(58) Field of Classification Search
CPC .......... B43K 5/1809; B43K 7/02; B43K 7/08; B43K 7/10; B43K 8/02; B43K 8/026; B43K 8/03; B43K 8/04; B43K 8/06; B43K 8/143; B43K 8/146
USPC .................................................. 401/223–227
See application file for complete search history.

(56) References Cited

U.S. PATENT DOCUMENTS

| | | | | |
|---|---|---|---|---|
| 2016/0250884 | A1 | 9/2016 | Kawasaki | |
| 2017/0311696 | A1 | 11/2017 | Saito | |
| 2019/0246767 | A1* | 8/2019 | Zhong | F16J 15/3228 |
| 2020/0130403 | A1* | 4/2020 | Maruyama | B43L 19/0018 |

FOREIGN PATENT DOCUMENTS

| | | | |
|---|---|---|---|
| JP | 2004-90253 | A | 3/2004 |
| JP | 2015-100981 | A | 6/2015 |
| JP | 2016-78325 | A | 5/2016 |

OTHER PUBLICATIONS

International Written Opinion dated Apr. 6, 2021 issued by the International Searching Authority in counterpart International Application No. PCT/JP2021/001243 (PCT/ISA/237).

International Preliminary Report on Patentability dated Nov. 29, 2021 issued by the International Searching Authority in counterpart International Application No. PCT/JP2021/001243 (PCT/IPEA/409).

* cited by examiner

DIRECT LIQUID TYPE PEN-SHAPED EYELINER

CROSS-REFERENCE TO RELATED APPLICATION

This is a continuation of International Application No. PCT/JP2021/001243 filed on Jan. 15, 2021, and claims priority from Japanese Patent Application No. 2020-005640 filed on Jan. 17, 2020, the entire content of which is incorporated herein by reference.

TECHNICAL FIELD

The present invention relates to a direct liquid type pen-shaped eyeliner.

BACKGROUND ART

A direct liquid type pen-shaped eyeliner accommodating a liquid coating material are known in the related art. Such a direct liquid type pen-shaped eyeliner is described in, for example, Patent Literature 1. In the direct liquid type pen-shaped eyeliner described in Patent Literature 1, a liquid coating material is guided to a brush portion through a relay core.

By the way, at present, eyeliners accommodating a liquid coating material containing a solid such as lame (metal powder) for giving luster to coating materials are generally distributed. In the field of cosmetics in particular, there are a lot of needs for such lame-containing eyeliners to show gorgeousness and an increase in coating material luster is also desired.

CITATION LIST

Patent Literature

Patent Literature 1: JP-UM-A-59-125314

SUMMARY OF INVENTION

However, in the case of, for example, an increase in the size or content of lame in a coating material for an increase in coating material luster, with the structure of the direct liquid type pen-shaped eyeliner of the related art described above, it is difficult to smoothly guide the coating material to the brush portion and eject the coating material from the brush portion without the lame clogging the direct liquid type pen-shaped eyeliner.

In this regard, the present invention provides a direct liquid type pen-shaped eyeliner capable of smoothly guiding and ejecting a coating material regardless of the type of the coating material.

A direct liquid type pen-shaped eyeliner according to an aspect of the present invention for achieving the above object is a direct liquid type pen-shaped eyeliner forming a rod shape, guiding a coating material toward a front end side from a rear end side in a longitudinal direction, and ejecting the coating material from the front end side. The direct liquid type pen-shaped eyeliner includes: a coating material tank where a coating material accommodating space accommodating the coating material is formed; an application member having a hole portion recessed from an end surface on the rear end side toward the front end side and ejecting the coating material; a coating material feeder forming a rod shape extending in the longitudinal direction, inserted into the hole portion from the rear end side, extending into the coating material accommodating space, and supplying the coating material in the coating material tank to the application member; and a pressure fluctuation buffer member forming a tubular shape extending in the longitudinal direction, disposed on an outer peripheral side of the coating material feeder, forming a buffer space connected to the coating material accommodating space inside, and buffering a pressure fluctuation in the coating material accommodating space by flow of the coating material and air between the coating material accommodating space and the buffer space. The coating material feeder includes: a coating material discharge region positioned in the hole portion; and a coating material guide region positioned outside the hole portion and guiding the coating material in the coating material tank toward the coating material discharge region. An upper peripheral groove recessed from an outer peripheral surface toward an inside in a feeder radial direction as a radial direction of the coating material feeder, facing an inner peripheral surface of the hole portion, and allowing the coating material to flow in is formed of resin in the coating material discharge region.

In the direct liquid type pen-shaped eyeliner, the upper peripheral groove may extend in the longitudinal direction and a plurality of the upper peripheral grooves may be formed at intervals in a feeder circumferential direction as a circumferential direction of the coating material feeder.

In the direct liquid type pen-shaped eyeliner, the coating material feeder may be a resin member where the coating material guide region and the coating material discharge region are integrally formed, the upper peripheral groove may be formed so as to extend in the longitudinal direction between the coating material discharge region and the coating material guide region and allow the hole portion and the coating material accommodating space to communicate with each other, and the coating material feeder may be supported by the pressure fluctuation buffer member by being fitted to the pressure fluctuation buffer member.

In the direct liquid type pen-shaped eyeliner, first and second grooves may be provided as the plurality of upper peripheral grooves and the second groove may be smaller than the first groove in depth dimension in the feeder radial direction, and the second groove may be disposed between the first grooves adjacent to each other in the feeder circumferential direction.

In the direct liquid type pen-shaped eyeliner, a lateral groove interconnecting the upper peripheral grooves adjacent to each other in the feeder circumferential direction may be further formed in the coating material feeder.

In the direct liquid type pen-shaped eyeliner, a maximum groove width dimension in the feeder circumferential direction in the upper peripheral groove may be 0.05 mm or more and 0.18 mm or less.

In the direct liquid type pen-shaped eyeliner, a ratio of a maximum depth dimension in the feeder radial direction in the upper peripheral groove to a maximum outer diameter dimension of the coating material discharge region may be 25% or more and 40% or less.

In the direct liquid type pen-shaped eyeliner, a ratio of an occupied area occupied by the upper peripheral groove in a cross section orthogonal to the longitudinal direction in the coating material discharge region may be 5% or more.

In the direct liquid type pen-shaped eyeliner, the coating material discharge region may have: a tubular body extending in the longitudinal direction, forming a tubular shape, and formed of resin; and a discharge side relay core body disposed in the tubular body and configured by converging a fiber, and the upper peripheral groove may be formed in the tubular body.

In the direct liquid type pen-shaped eyeliner, the upper peripheral groove penetrates the tubular body in the feeder radial direction in such a manner that the coating material of the discharge side relay core body may be dischargeable to the application member via the upper peripheral groove.

In the direct liquid type pen-shaped eyeliner, the hole portion may have a shape with an inner diameter gradually decreasing toward the front end side, and the discharge side relay core body may protrude from the tubular body to the front end side and have an outer diameter gradually decreasing toward the front end side along the shape of the hole portion.

In the direct liquid type pen-shaped eyeliner, the coating material guide region may have a rod-shaped guide side relay core body configured by converging a fiber, and the guide side relay core body and the discharge side relay core body may be integrated.

In the direct liquid type pen-shaped eyeliner, the coating material discharge region may be a rod-shaped body extending in the longitudinal direction, forming a rod shape, and formed of resin, the coating material guide region may be a rod-shaped relay core body configured by converging a fiber, a front end side in the relay core body may have an abutting surface abutting against an end surface on a rear end side of the rod-shaped body from the rear end side and the rear end side in the relay core body may be disposed in the coating material space, and a rear end side of the upper peripheral groove formed in an outer peripheral surface of the rod-shaped body may be open toward the abutting surface.

In the direct liquid type pen-shaped eyeliner, the coating material guide region may be inserted through and loosely fitted to the pressure fluctuation buffer member, and a flow space capable of guiding the coating material in the coating material accommodating space to the upper peripheral groove by allowing the upper peripheral groove in the coating material discharge region and the coating material accommodating space to communicate with each other may be formed at a boundary between an inner peripheral surface of the pressure fluctuation buffer member and an outer peripheral surface of the coating material guide region.

In the direct liquid type pen-shaped eyeliner, the pressure fluctuation buffer member may have a main body cylinder portion allowing the coating material feeder to be inserted through the main body cylinder portion and forming a wall portion inside in the feeder radial direction with respect to the buffer space, and the main body cylinder portion may have an air flow hole penetrating the main body cylinder portion in the feeder radial direction and allowing the buffer space and the coating material accommodating space to communicate with each other and a connecting flow path penetrating the main body cylinder portion in the feeder radial direction at a position separated from the air flow hole in the longitudinal direction and allowing the buffer space and the upper peripheral groove to communicate with each other.

A direct liquid type pen-shaped eyeliner according to another aspect of the present invention is a direct liquid type pen-shaped eyeliner forming a rod shape, guiding a coating material toward a front end side from a rear end side in a longitudinal direction, and ejecting the coating material from the front end side. The direct liquid type pen-shaped eyeliner includes: an application member having a hole portion recessed from an end surface on the rear end side toward the front end side and ejecting the coating material; a coating material feeder forming a rod shape extending in the longitudinal direction and inserted into the hole portion from the rear end side; a coating material tank having a coating material accommodating space accommodating the coating material and supplying the coating material to the coating material feeder; and a pressure fluctuation buffer member forming a tubular shape extending in the longitudinal direction, disposed on an outer peripheral side of the coating material feeder, forming a buffer space connected to the coating material accommodating space inside, and buffering a pressure fluctuation in the coating material accommodating space by flow of the coating material and air between the coating material accommodating space and the buffer space. The coating material feeder is a relay core body configured by converging a fiber and is inserted through and loosely fitted to the pressure fluctuation buffer member, and a flow space capable of guiding the coating material in the coating material accommodating space to the hole portion by allowing the hole portion and the coating material accommodating space to communicate with each other is formed at a boundary between an inner peripheral surface of the pressure fluctuation buffer member and an outer peripheral surface of the coating material feeder.

In the direct liquid type pen-shaped eyeliner, the pressure fluctuation buffer member may be provided with a feeder support portion supporting the coating material feeder in a state where the flow space is formed, the coating material feeder may have a contact region disposed in the coating material accommodating space and coming into contact with a coating material on an outer peripheral surface, and the feeder support portion may support the coating material feeder on the rear end side beyond the contact region.

In the direct liquid type pen-shaped eyeliner, $\alpha<\beta+0.040$ mm may be satisfied in a case where a maximum outer diameter dimension of the coating material feeder measured by contour projection is defined as $\alpha$ and an inner diameter dimension of the pressure fluctuation buffer member is defined as $\beta$.

In the direct liquid type pen-shaped eyeliner, the maximum outer diameter dimension $\alpha$ of the coating material feeder and the inner diameter dimension $\beta$ of the pressure fluctuation buffer member may satisfy $\alpha<\beta$.

In the direct liquid type pen-shaped eyeliner, the maximum outer diameter dimension $\alpha$ of the coating material feeder and the inner diameter dimension $\beta$ of the pressure fluctuation buffer member may satisfy $\beta-0.25\text{ mm}\leq\alpha$.

In the direct liquid type pen-shaped eyeliner, the coating material may be a solid-containing liquid coating material.

Advantageous Effects of Invention

With the direct liquid type pen-shaped eyeliner of the above aspect, a coating material can be guided and ejected smoothly.

BRIEF DESCRIPTION OF DRAWINGS

FIG. 6A is a view illustrating the B-B cross section of FIG. 5, and FIG. 6B is a view illustrating the C-C cross section of FIG. 5.

FIG. 9A is a view illustrating the E-E cross section of FIG. 8, FIG. 9B is a view illustrating the F-F cross section of FIG. 8, and FIG. 9C is a view illustrating the G-G cross section of FIG. 8.

DESCRIPTION OF EMBODIMENTS

First Embodiment

Hereinafter, a first embodiment of the present invention will be described with reference to the accompanying drawings.

(Overall Configuration)

Figure 1:
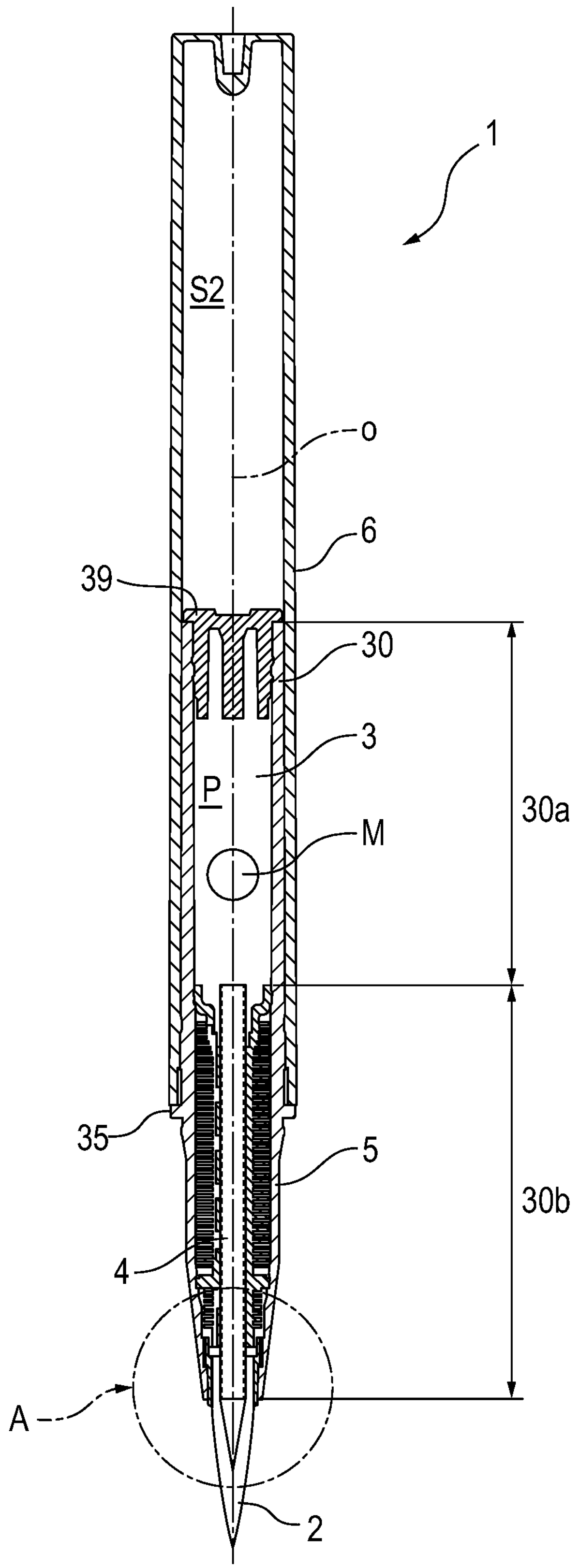
FIG. 1 is a vertical cross-sectional view of a direct liquid type pen-shaped eyeliner according to a first embodiment of the present invention.

As illustrated in FIG. 1, a direct liquid type pen-shaped eyeliner 1 forms a rod shape, guides a coating material P from the rear end side to the front end side, and ejects the coating material P from the front end side.

The direct liquid type pen-shaped eyeliner 1 includes an application member 2 ejecting the coating material P, a coating material tank 3 forming a coating material accommodating space accommodating the coating material P, a coating material feeder 4 supplying the coating material from the coating material tank 3 to the application member 2, a pressure fluctuation buffer member 5 buffering pressure fluctuations in the coating material accommodating space, and an outer case 6 provided on the outer peripheral side of the pressure fluctuation buffer member 5.

(Application Member)

The application member 2 is, for example, a brush and is a fibrous aggregate made of a synthetic resin such as nylon and polybutylene terephthalate (PBT). The application member 2 is not limited to the brush and may be, for example, a sintered pen-type member, a member formed of porous urethane, or the like. In a case where the coating material P contains a solid, the application member 2 is preferably a brush. In particular, in a case where the coating material P contains a solid, it is preferable that the application member 2 is a convergent body of synthetic fibers such as nylon having pliability, elasticity, and flexibility.

Figure 2:
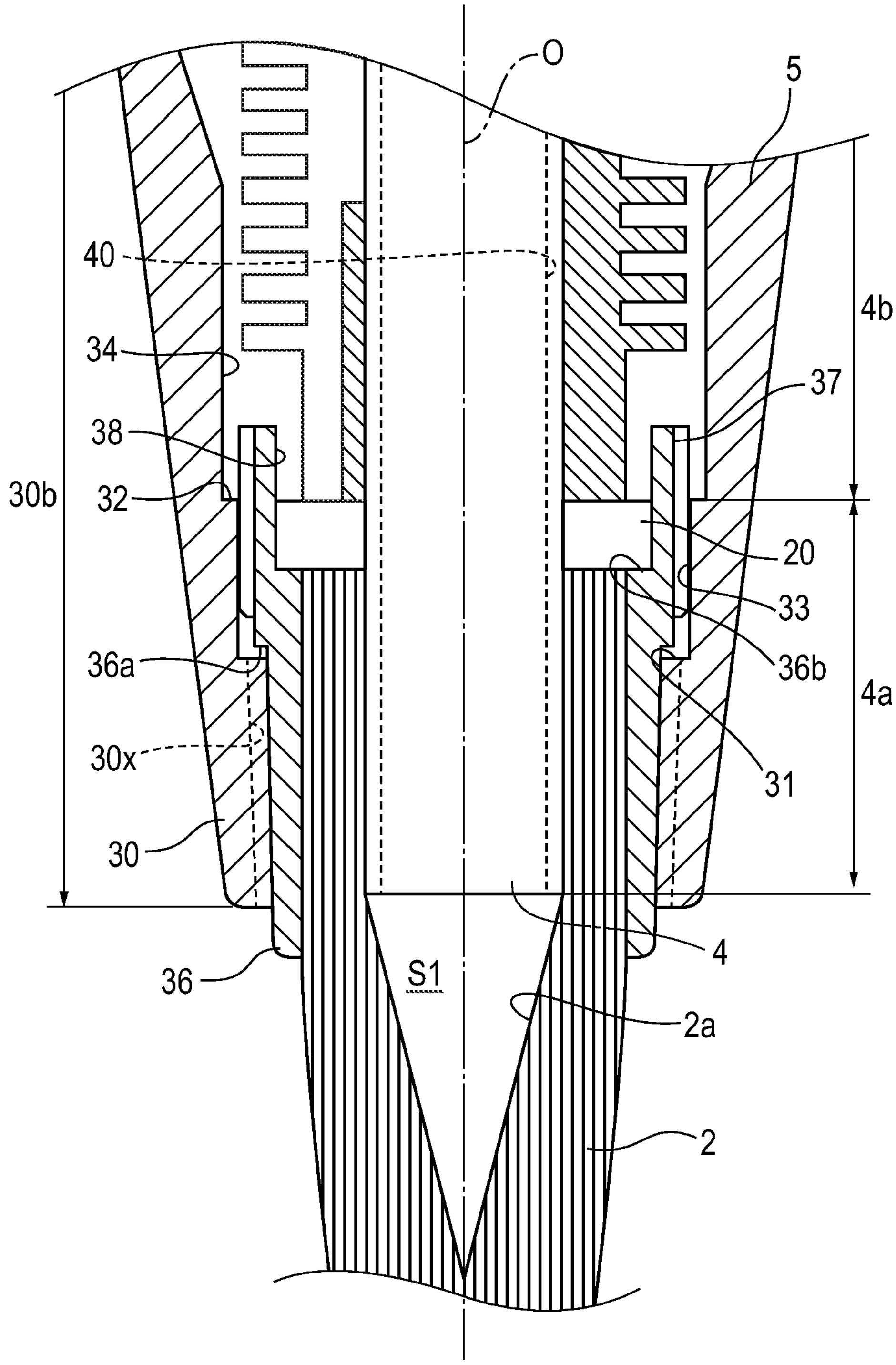
FIG. 2 is an enlarged view of a main part of the direct liquid type pen-shaped eyeliner and is a view illustrating the A part in FIG. 1.

As illustrated in FIG. 1, the application member 2 has a round bar shape extending in the axial direction (longitudinal direction) about an axis O. In addition, the application member 2 has a conical shape in which the outer diameter gradually decreases from the intermediate position in the axial direction toward the front end side. As illustrated in FIG. 2, a hole portion 2a recessed toward the front end side is formed in the end surface on the rear end side of the application member 2. The hole portion 2a has a tapered shape in which the inner diameter gradually decreases from the rear end side toward the front end side. Although the inner diameter of the hole portion 2a may be equal to the outer diameter of the coating material feeder 4, which will be described later, a space (clearance) where the coating material P is capable of flowing may be formed between the outer peripheral surface of the coating material feeder 4 and the inner peripheral surface of the hole portion 2a with the inner diameter of the hole portion 2a slightly larger than the outer diameter of the coating material feeder 4.

In addition, a fixing layer 20 bundling each fiber of the application member is provided in the end portion on the rear end side of the application member 2. The hole portion 2a penetrates the fixing layer 20. The fixing layer 20 is formed by mutually fixing the fibers of the application member 2 with, for example, an adhesive material. The fixing layer 20 has a disk shape centered on the axis O. The outer diameter of the fixing layer 20 is slightly larger than the outer diameter of the application member 2, and thus the fixing layer 20 protrudes in a flange shape from the application member 2 to the outer peripheral side.

(Coating Material Feeder)

The coating material feeder 4 has a round bar shape extending in the axial direction about the axis O. In addition, the coating material feeder 4 is provided by being inserted into the hole portion 2a from the rear end side of the application member 2. The coating material feeder 4 has a coating material discharge region 4a positioned inside the hole portion 2a and a coating material guide region 4b positioned outside the hole portion 2a on the rear end side of the coating material discharge region 4a.

Hereinafter, the direction orthogonal to the axial direction, that is, the radial direction of the coating material feeder 4 will be referred to as the feeder radial direction. In addition, the circumferential direction of the coating material feeder 4 will be referred to as the feeder circumferential direction.

The end surface on the front end side of the coating material discharge region 4a is a flat surface extending in the feeder radial direction. Accordingly, a conical space S1 sandwiched between the coating material discharge region 4a and the inner surface of the hole portion 2a is formed on the front end side beyond the end surface on the front end side of the coating material discharge region 4a. The coating material discharge region 4a is formed of a synthetic resin. Exemplified as the synthetic resin is a resin such as polyacetal (POM), polyamide (PA) <nylon>, polyethylene terephthalate (PET), polybutylene terephthalate (PBT), polyethylene (PE), polypropylene (PP), polyvinyl chloride (PVC), polystyrene (PS), and polycarbonate (PC).

The coating material guide region 4b is provided integrally with the coating material discharge region 4a. In other words, the coating material guide region 4b is also formed of the same resin as the coating material discharge region 4a. The coating material discharge region 4a and the coating material guide region 4b are integrally molded by, for example, extrusion molding. In addition, the end portion on the rear end side of the coating material guide region 4b is disposed in the coating material accommodating space of the coating material tank 3 to be described later (see FIG. 1).

Figure 3:
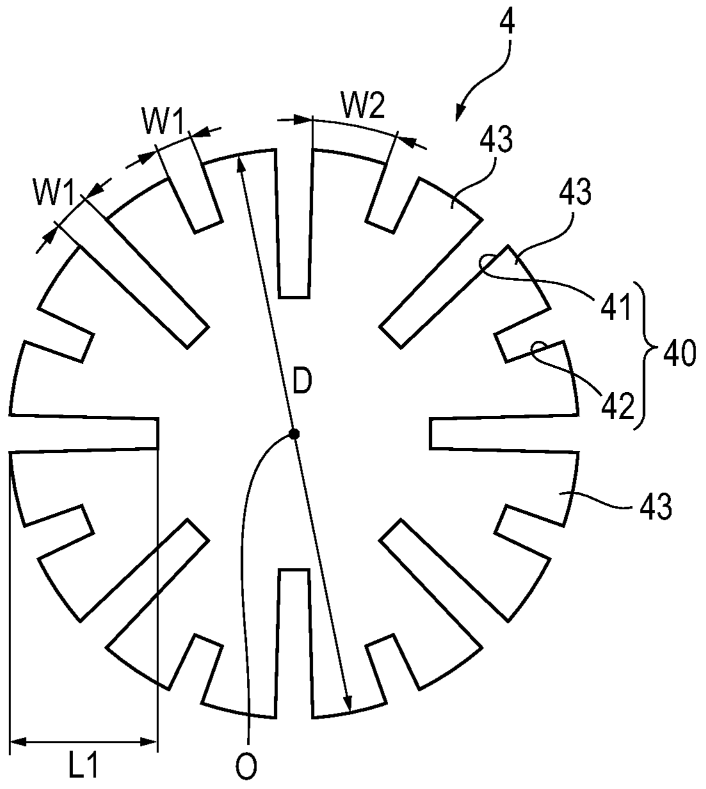
FIG. 3 is a lateral cross-sectional view of a coating material feeder in the direct liquid type pen-shaped eyeliner.

As illustrated in FIG. 3, an upper peripheral groove 40 is formed in the coating material feeder 4. The coating material feeder 4 is formed of resin, and thus the upper peripheral groove 40 is also formed of resin. A plurality of the upper peripheral grooves 40 are formed at intervals in the feeder circumferential direction. Each of the upper peripheral grooves 40 is formed so as to extend in the axial direction between the coating material discharge region 4*a* and the coating material guide region 4*b*. Each of the upper peripheral grooves 40 is recessed toward the inside in the feeder radial direction from the outer peripheral surfaces of the coating material discharge region 4*a* and the coating material guide region 4*b* and is formed over the entire axial region in the coating material feeder 4. Each of the upper peripheral grooves 40 is open to the end surface on the front end side of the coating material discharge region 4*a* and is also open to the end surface on the rear end side of the coating material guide region 4*b*. The upper peripheral groove 40 faces the inner peripheral surface of the hole portion 2*a* in the application member 2 and allows the hole portion 2*a* of the application member 2 and the coating material accommodating space of the coating material tank 3 (see FIG. 1) to communicate with each other.

Figure 4:
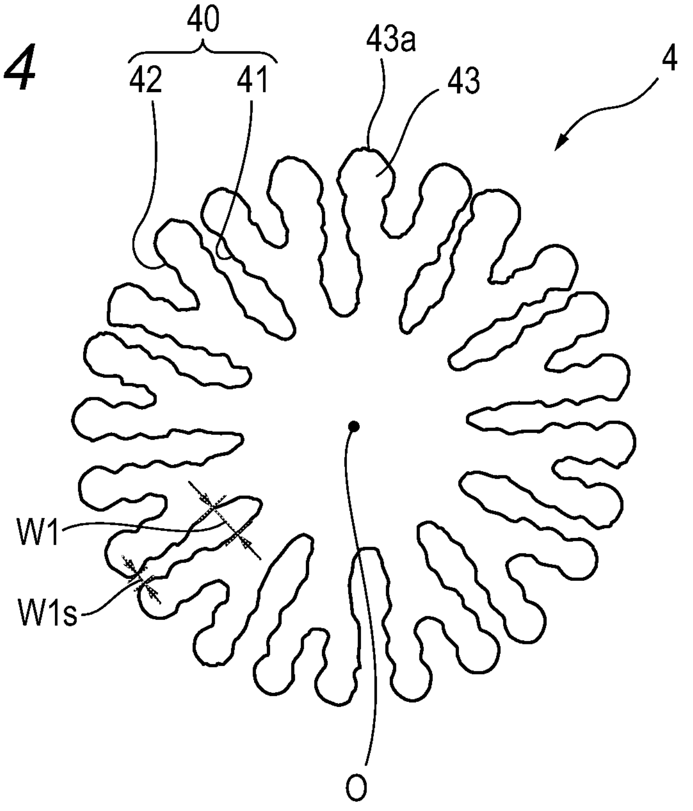
FIG. 4 is a photograph corresponding to the cross-sectional view of FIG. 3.

The coating material feeder 4 is provided with a first groove 41 and a second groove 42 as the upper peripheral groove 40, and the second groove 42 is smaller than the first groove 41 in depth dimension in the feeder radial direction. The second groove 42 is disposed between the first grooves 41 that are adjacent to each other in the feeder circumferential direction. In the present embodiment, the first grooves 41 and the second grooves 42 are alternately disposed at equal intervals in the feeder circumferential direction. As illustrated in FIG. 4, the part that is surrounded by the first grooves 41 adjacent to each other in the feeder circumferential direction has a Y shape when viewed from the axial direction, and a protruding portion 43 is formed between the upper peripheral grooves 40.

In the present embodiment, the outermost surface of the protruding portion 43 in the feeder radial direction, that is, the surface that forms the outer peripheral surface of the coating material feeder 4 is a circular arc surface 43*a* when viewed from the axial direction. In addition, the circular arc surface 43*a* is positioned on the outermost side in the feeder radial direction in the middle portion of each protruding portion 43 in the feeder circumferential direction. As a result, the circular arc surface 43*a* is in line contact with the inner peripheral surface of the pressure fluctuation buffer member 5, which will be described later.

Returning to FIG. 3, a maximum groove width dimension W1 in the feeder circumferential direction in each upper peripheral groove 40 is preferably 0.05 mm or more and 0.18 mm or less. In addition, the maximum groove width dimension W1 is further preferably 0.05 mm or more and 0.16 mm or less. In addition, the ratio of the maximum groove width dimension W1 in the feeder circumferential direction in the upper peripheral groove 40 to a maximum outer diameter dimension D of the coating material discharge region 4*a* (coating material feeder 4) may be 2.5% or more and 9.2% or less and is preferably 2.5% or more and 8.2% or less. Further, a maximum depth dimension (maximum depth dimension of the first groove 41) L1 in the feeder radial direction in the upper peripheral groove 40 with respect to the maximum outer diameter dimension D of the coating material discharge region 4*a* is preferably 25% or more and 40% or less. In addition, in the cross section orthogonal to the axial direction in the coating material discharge region 4*a*, the ratio of the occupied area occupied by the upper peripheral groove 40 is preferably 5% or more, more preferably 10% or more, and further preferably 20% or more.

Further, the ratio of the area of opening of the upper peripheral groove 40 to the outer peripheral surface of the coating material discharge region 4*a* to the surface area of the outer peripheral surface of the coating material discharge region 4*a* is preferably 30% or more and more preferably 50% or more.

Further, as illustrated in FIG. 4, each upper peripheral groove 40 has a groove width dimension in the feeder circumferential direction that changes in the feeder radial direction. In the present embodiment, the groove width dimension gradually increases, gradually decreases, and then increases again from the inside end portion in the feeder radial direction toward the outside end portion in the feeder radial direction. Accordingly, in the upper peripheral groove 40 of the present embodiment, the part that has a minimum groove width dimension W1*s* is positioned outside the part that has the maximum groove width dimension W1 in the feeder radial direction. By the groove width dimension being increased at the opening position of the outside end portion in the feeder radial direction as in the example of FIG. 4, the groove width dimension of this opening position may be larger than the maximum groove width dimension W1. Accordingly, the maximum groove width dimension W1 in the example of FIG. 4 indicates the maximum value of the groove width dimension at the position excluding the opening position of the upper peripheral groove 40 in the feeder radial direction. The minimum groove width dimension W1*s* is also preferably 0.05 mm or more and 0.18 mm or less and further preferably 0.05 mm or more and 0.16 mm or less.

(Coating Material Tank)

Returning to FIG. 1, the coating material tank 3 is provided so as to extend to the rear end side from the end portion on the rear end side of the coating material feeder 4.

The coating material tank 3 has an outer cylinder portion 30 having a cylindrical shape extending in the axial direction and a tail plug 39 blocking the rear end side of the outer cylinder portion 30. The space that is surrounded by the outer cylinder portion 30, the tail plug 39, and the pressure fluctuation buffer member 5 to be described later is the coating material accommodating space accommodating the coating material. A liquid coating material or a solid-containing liquid coating material is accommodated as the coating material P in the coating material accommodating space. The liquid coating material is, for example, a liquid ink for use in a writing tool or an eyeliner. In addition, the solid is higher in specific gravity than the liquid coating material and examples of the solid include metal powder such as titanium and aluminum, lame made by thin-filming gold, silver, aluminum, tin, or the like by vapor deposition or the like, and inorganic substances such as glass beads. The viscosity of the solid-containing coating material P is, for example, approximately 4 m·Pas or more and 17 m·Pas or less.

A stirring member M is accommodated in the coating material accommodating space in the coating material tank 3. By shaking the entire direct liquid type pen-shaped eyeliner 1 in the axial direction, the coating material P in the coating material tank 3 can be stirred by the stirring member M. Although the shape of the stirring member M is not limited, the shape may be, for example, a spherical shape, a columnar shape, or a polyhedral shape such as a cubic shape and a rectangular parallelepiped shape. In addition, the stirring member M is optional depending on the type of the coating material P.

The outer cylinder portion 30 has a space forming region 30*a* forming the coating material accommodating space and a feeder accommodating region 30*b* extending further to the front end side from the space forming region 30*a*. The feeder accommodating region 30*b* is disposed outside the coating material feeder 4 in the feeder radial direction, is provided at a position overlapping the coating material feeder 4 when viewed from the feeder radial direction, and covers the coating material feeder 4. In addition, the feeder accommodating region 30*b* has a tapered shape in which the outer diameter gradually decreases from the intermediate position in the axial direction toward the front end side. As illustrated in FIG. 2, the end portion on the front end side in the feeder accommodating region 30*b* is disposed outside in the feeder radial direction with respect to the application member 2, is provided at a position overlapping the application member 2 when viewed from the feeder radial direction, and covers the application member 2.

Further, on the inner surface of the end portion on the front end side of the outer cylinder portion 30, a first step surface 31 forming an annular shape centered on the axis O and facing the rear end side in the axial direction and a second step surface 32 disposed on the rear end side beyond the first step surface 31 and forming an annular shape centered on the axis O are formed at intervals in the axial direction. Formed in the feeder accommodating region 30*b* in the outer cylinder portion 30 as a result are a first recess portion 33 annularly recessed about the axis O from the inner peripheral surface of the outer cylinder portion 30 to the outside in the feeder radial direction and a second recess portion 34 disposed on the rear end side beyond the first recess portion 33 and annularly recessed about the axis O. As a result, the inner diameter of the outer cylinder portion 30 decreases in stages toward the front end side. In addition, in the outer cylinder portion 30, an air flow groove 30*x* communicating with the first recess portion 33, extending in the axial direction, and open to the end surface on the front end side of the outer cylinder portion 30 is formed at a part in the feeder circumferential direction. Air is exchanged inside and outside a buffer space K, which will be described later, via the air flow groove 30*x*, the first recess portion 33, and the second recess portion 34. In addition, in the feeder accommodating region 30*b* in the outer cylinder portion 30, an outer cylinder flange 35 protruding in an annular shape to the outside in the feeder radial direction is provided at the axially intermediate position that is on the rear end side beyond the second step surface 32 (see FIG. 1).

Further, an inner cylinder portion 36 is provided between the outer cylinder portion 30 and the application member 2. The inner cylinder portion 36 extends in the axial direction and is engaged with the fixing layer 20 and the outer cylinder portion 30. The inner cylinder portion 36 covers the end portion on the rear end side of the application member 2 so as to press the end portion from the outside in the feeder radial direction. Specifically, an outside step surface 36*a* forming an annular shape centered on the axis O and facing the front end side in the axial direction is formed on the outer peripheral surface of the inner cylinder portion 36. By the outside step surface 36*a*, an outside protrusion portion 37 forming an annular shape centered on the axis O and protruding to the outside in the feeder radial direction is formed on the outer peripheral surface of the inner cylinder portion 36. As a result, the outer diameter of the inner cylinder portion 36 is larger on the rear end side than on the front end side.

The inner cylinder portion 36 is disposed such that the outside protrusion portion 37 of the inner cylinder portion 36 is disposed in the first recess portion 33 of the outer cylinder portion 30 and the outside step surface 36*a* of the inner cylinder portion 36 faces the first step surface 31 of the outer cylinder portion 30 in the axial direction. As a result, the outside step surface 36*a* of the inner cylinder portion 36 and the first step surface 31 of the outer cylinder portion 30 are engaged with each other and the inner cylinder portion 36 is engaged with the outer cylinder portion 30. Further, an inside step surface 36*b* disposed on the rear end side beyond the outside step surface 36*a*, facing the rear end side, and forming an annular shape centered on the axis O is formed on the inner peripheral surface of the inner cylinder portion 36. By the inside step surface 36*b*, an inside recess portion 38 forming an annular shape centered on the axis O and recessed to the outside in the feeder radial direction is formed in the inner peripheral surface of the inner cylinder portion 36. The fixing layer 20 is disposed in the inside recess portion 38, the inner cylinder portion 36 and the fixing layer 20 are engaged with each other, and the outer cylinder portion 30 supports the application member 2 via the inner cylinder portion 36.

(Outer Case)

The outer case 6 abuts against the outer cylinder flange 35 of the outer cylinder portion 30 in the axial direction from the rear end side and covers the outer cylinder portion 30 from the outside in the feeder radial direction on the rear end side beyond the outer cylinder flange 35. In other words, the outer case 6 has a bottomed cylindrical shape extending in the axial direction about the axis O such that the outer cylinder portion 30 can be inserted. The outer cylinder portion 30 is fitted to the outer case 6, and the outer case 6 and the outer cylinder portion 30 are fixed to each other. Inside the outer case 6, a space S2 is formed in the region that is sandwiched between the bottom surface of the outer case 6 and the tail plug 39 in the coating material tank 3 (see FIG. 1).

(Pressure Fluctuation Buffer Member)

Figure 5:
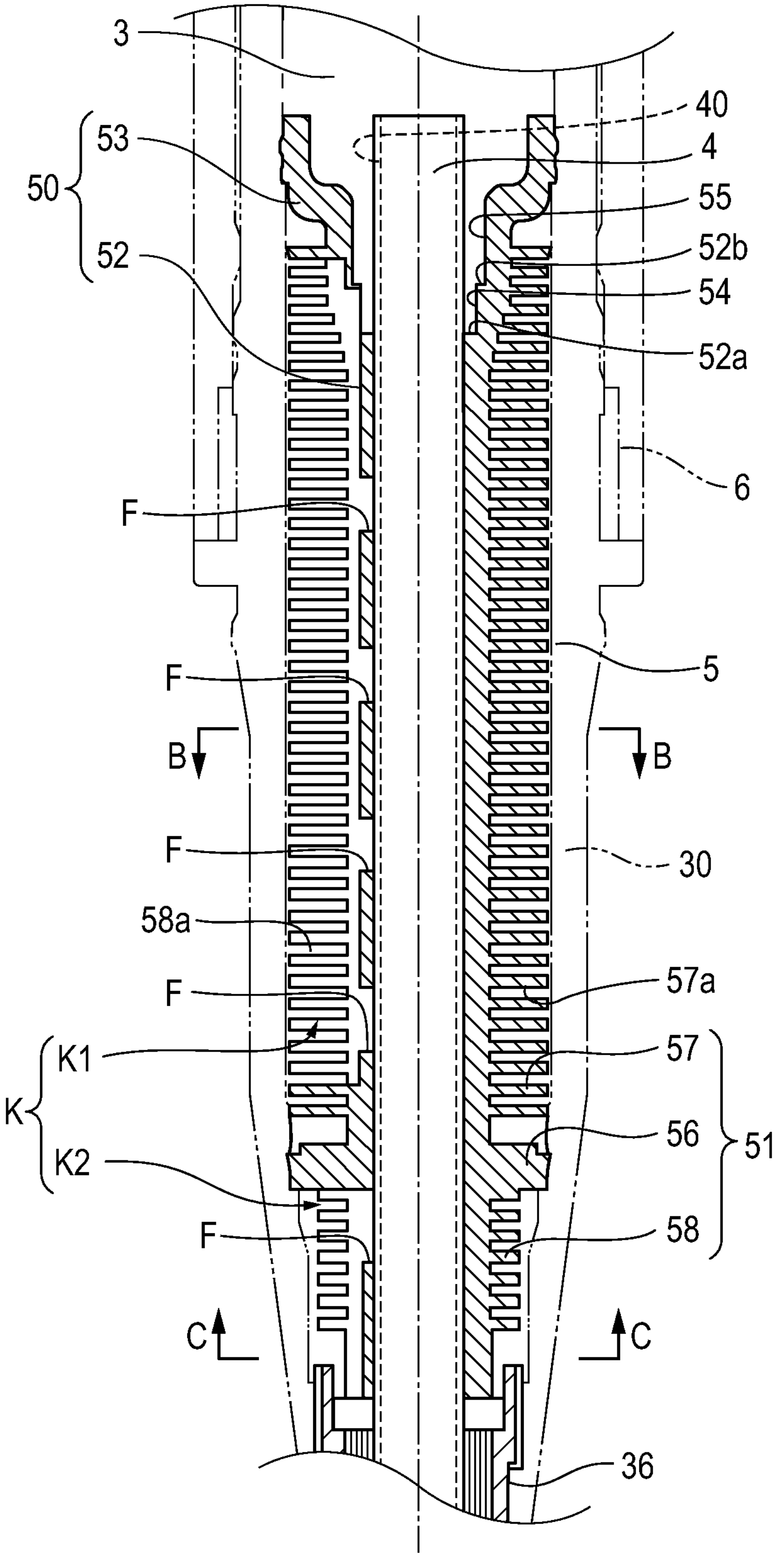
FIG. 5 is a vertical cross-sectional view of a pressure fluctuation buffer member in the direct liquid type pen-shaped eyeliner.

As illustrated in FIG. 5, the pressure fluctuation buffer member 5 has a feeder holding cylinder 50 and a buffer mechanism 51 forming the buffer space K between the feeder holding cylinder 50 and the inner peripheral surface of the outer cylinder portion 30 outside the feeder holding cylinder 50 in the feeder radial direction. The pressure fluctuation buffer member 5 is formed of a synthetic resin. In a case where the coating material P in the coating material tank 3 is a water-based coating material, ABS resin, AS resin, PET resin, PBT resin, styrene resin, POM resin, polycarbonate, polyamide, modified polyphenylene ether, or the like can be used as the synthetic resin. In addition, in a case where the coating material P in the coating material tank 3 is an oil-based coating material (particularly a coating material with alcohol as the main solvent thereof), PE resin, PP resin, POM resin, PET resin, PBT resin, polyamide, or the like can be used as the synthetic resin.

(Feeder Holding Cylinder)

The feeder holding cylinder 50 extends in the axial direction. The feeder holding cylinder 50 has a main body cylinder portion 52, which has a cylindrical shape centered on the axis O and through which the coating material feeder 4 is inserted, and an extending portion 53 provided integrally with the main body cylinder portion 52 on the rear end side of the main body cylinder portion 52.

The coating material feeder 4 is fitted to the main body cylinder portion 52, and thus the upper peripheral groove 40 of the coating material feeder 4 faces the inner peripheral surface of the main body cylinder portion 52 in the feeder radial direction. In addition, the outermost end in the feeder radial direction in the protruding portion 43 (see FIGS. 3 and 4) of the coating material feeder 4 is in line contact with the inner peripheral surface of the main body cylinder portion 52. A width dimension W2 (see FIG. 3) of the protruding portion 43 in the feeder circumferential direction is very small, the coating material feeder 4 is fitted to the main body cylinder portion 52, and thus the protruding portion 43 is pushed and deformed by the inner peripheral surface of the main body cylinder portion 52 and a very small gap (not illustrated) is formed between the main body cylinder portion 52 and the coating material feeder 4. Because of this small gap, the space where the upper peripheral grooves 40 adjacent to each other in the feeder circumferential direction communicate with each other is between the main body cylinder portion 52 and the coating material feeder 4.

In addition, in the end portion on the rear end side of the main body cylinder portion 52, a first step surface 52*a* facing the rear end side in the axial direction and a second step surface 52*b* facing the rear end side in the axial direction and disposed on the rear end side beyond the first step surface 52*a* are formed at intervals in the axial direction. Formed in the main body cylinder portion 52 as a result are a first annular recess portion 54 annularly recessed to the outside in the radial direction from the inner peripheral surface of the main body cylinder portion 52 and a second annular recess portion 55 further recessed to the outside in the feeder radial direction than the first annular recess portion 54 on the rear end side beyond the first annular recess portion 54. The first annular recess portion 54 penetrates the main body cylinder portion 52 in the feeder radial direction at a part in the feeder circumferential direction and is open to a first buffer space K1 to be described later. As a result, the first annular recess portion 54 functions as an air flow hole where air is capable of flowing between the inside of the first buffer space K1 and the coating material accommodating space.

As a result, in the end portion on the rear end side of the main body cylinder portion 52, the inner diameter of the main body cylinder portion 52 is increased in stages toward the rear end side. In addition, on the outer peripheral surface of the main body cylinder portion 52, a plurality of connecting flow paths F penetrating the inside and outside of the main body cylinder portion 52 at positions separated from the first annular recess portion 54 on the front end side in the axial direction are provided at intervals in the axial direction at a part in the feeder circumferential direction. Each of the connecting flow paths F has a slit shape extending in the axial direction. Although the connecting flow path F is not particularly limited in number, the connecting flow path F may be provided in at least one place so as to communicate with the first buffer space K1 to be described later and one place so as to communicate with a second buffer space K2. In addition, the main body cylinder portion 52 forms a wall portion on the inside in the feeder radial direction with respect to the first buffer space K1 and the second buffer space K2, which will be described later. By the connecting flow path F, the first buffer space K1 and the second buffer space K2, which will be described later, and the upper peripheral groove 40 communicate with each other.

The extending portion 53 has a cylindrical shape centered on the axis O and extending so as to increase the inner diameter of the main body cylinder portion 52 toward the rear end side. Specifically, the extending portion 53 has an inner surface flush with the inner surface of the second annular recess portion 55 of the main body cylinder portion 52 and extends to the rear end side with the same inner diameter as the second annular recess portion 55, and then the extending portion 53 is bent or curved so as to increase the inner diameter and extends to the rear end side. The extending portion 53 is in contact with the inner peripheral surface of the outer cylinder portion 30 in the end portion on the rear end side.

The first annular recess portion 54 and the second annular recess portion 55 in the main body cylinder portion 52 and the extending portion 53 form a wall on the front end side of the coating material tank 3 and define the coating material accommodating space. As a result, the coating material P is in the first annular recess portion 54, the second annular recess portion 55, and the extending portion 53. The end portion on the rear end side of the coating material guide region 4*b* in the coating material feeder 4 is disposed inside the extending portion 53.

(Buffer Mechanism)

The buffer mechanism 51 is formed integrally with the feeder holding cylinder 50. The buffer mechanism 51 has a partition member 56 protruding in an annular shape about the axis O from the main body cylinder portion 52 toward the outside in the feeder radial direction at the axially intermediate position in the main body cylinder portion 52, a first protrusion member 57 formed on the outer peripheral surface of the main body cylinder portion 52 on the rear end side beyond the partition member 56, and a second protrusion member 58 formed on the outer peripheral surface of the main body cylinder portion 52 on the front end side beyond the partition member 56.

The partition member 56 protrudes to the outside in the feeder radial direction from the main body cylinder portion 52 and is in contact with the inner surface of the outer cylinder portion 30. As a result, the partition member 56 divides the space between the main body cylinder portion 52 and the outer cylinder portion 30, that is, the buffer space K into two in the axial direction and forms wall portions of the first buffer space K1 on the rear end side and the second buffer space K2 on the front end side.

The first protrusion member 57 is a plate-shaped member forming a circular ring shape about the axis O and protruding to the outside in the feeder radial direction from the main body cylinder portion 52. The first protrusion member 57 forms the first buffer space K1 between the main body cylinder portion 52 and the outer cylinder portion 30. A plurality of the first protrusion members 57 are provided at intervals in the axial direction. The first protrusion member 57 extends toward the inner peripheral surface of the outer cylinder portion 30. A first peripheral groove 57*a* is formed between the first protrusion members 57 that are adjacent to each other in the axial direction.

Figure 6A:
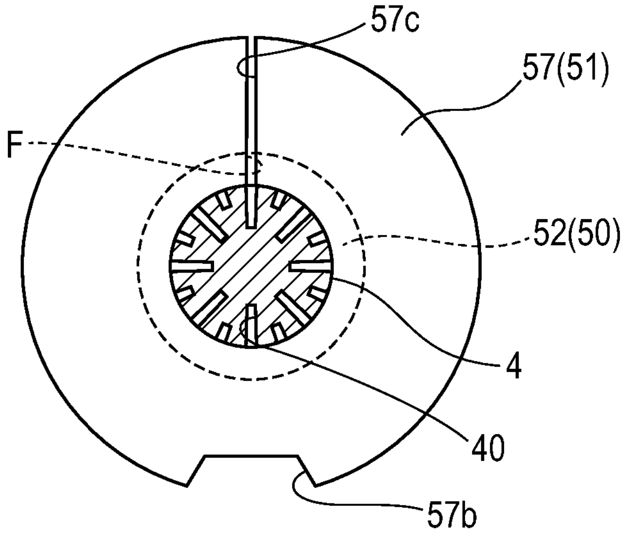
FIGS. 6A and 6B are lateral cross-sectional views of the pressure fluctuation buffer member in the direct liquid type pen-shaped eyeliner.

As illustrated in FIG. 6A, each of the first protrusion members 57 is provided with a first air groove 57*b* and a first coating material groove 57*c* recessed to the inside in the feeder radial direction from the outer peripheral surface of the first protrusion member 57 and penetrating the first protrusion member 57 in the axial direction. The first coating material grooves 57*c* provided in the first protrusion members 57 are mutually aligned in the axial direction. The groove width dimensions of the first peripheral groove 57*a* and the first coating material groove 57*c* (width dimensions in the feeder circumferential direction) are dimensions at which the coating material P is capable of infiltrating by the capillary force.

In addition, the first coating material groove 57*c* communicates with the connecting flow path F of the main body cylinder portion 52. The coating material P is capable of flowing between the first buffer space K1 (see FIG. 5) and the upper peripheral groove 40 of the coating material feeder 4 inserted through the main body cylinder portion 52 via the connecting flow path F.

The first air grooves 57*b* provided in the first protrusion members 57 are mutually aligned in the axial direction. The first air groove 57*b* may be disposed on the opposite side (position shifted by 180 degrees) in the feeder circumferential direction with respect to the first coating material groove 57*c*.

As in the case of the first protrusion member 57, the second protrusion member 58 is a plate-shaped member forming a circular ring shape about the axis O and protruding to the outside in the feeder radial direction from the main body cylinder portion 52. The second protrusion member 58 forms the second buffer space K2 between the main body cylinder portion 52 and the outer cylinder portion 30. A plurality of the second protrusion members 58 are provided at intervals in the axial direction. The second protrusion member 58 extends toward the inner peripheral surface of the outer cylinder portion 30. A second peripheral groove 58*a* is formed between the second protrusion members 58 that are adjacent to each other in the axial direction.

Figure 6B:
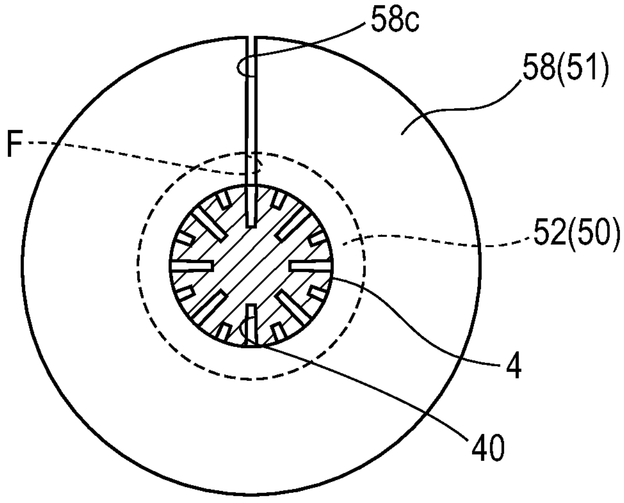

As illustrated in FIG. 6B, each of the second protrusion members 58 is provided with a second coating material groove 58*c* recessed to the inside in the feeder radial direction from the outer peripheral surface of the second protrusion member 58 and penetrating the first protrusion member 57 in the axial direction. The second coating material grooves 58*c* provided in the second protrusion members 58 are mutually aligned in the axial direction. The groove width dimensions of the second peripheral groove 58*a* and the second coating material groove 58*c* (width dimensions in the feeder circumferential direction) are dimensions at which the coating material P is capable of infiltrating by the capillary force.

The partition member 56 is disposed between the second coating material groove 58*c* and the first coating material groove 57*c*. In other words, the second coating material groove 58*c* is disposed at a position axially separated from the first coating material groove 57*c*.

In addition, a gap is formed between the tip surface (outermost end surface in the feeder radial direction) of the second protrusion member 58 and the inner peripheral surface of the outer cylinder portion 30. This gap functions as an air flow passage in the second buffer space K2. As in the case of the first protrusion member 57, each second protrusion member 58 may be provided with an air groove (not illustrated).

In addition, the second coating material groove 58*c* communicates with the connecting flow path F of the main body cylinder portion 52. The coating material P is capable of flowing between the second buffer space K2 and the upper peripheral groove 40 of the coating material feeder 4 inserted through the main body cylinder portion 52 via the connecting flow path F.

(Action and Effect)

Next, the action and effect of the direct liquid type pen-shaped eyeliner 1 will be described.

With the direct liquid type pen-shaped eyeliner 1 according to the present embodiment described above, the upper peripheral groove 40 faces the inner peripheral surface of the hole portion 2*a* in the hole portion 2*a* of the application member 2. Accordingly, the coating material P can be exuded from the inside of the upper peripheral groove 40 toward the outside in the feeder radial direction toward the inner peripheral surface of the hole portion 2*a* in the hole portion 2*a*. As a result, the coating material P guided into the upper peripheral groove 40 from the front end side by the coating material guide region 4*b* in the coating material feeder 4 can be diffused from the coating material discharge region 4*a* in the coating material feeder 4 toward the application member 2, and the coating material P is capable of smoothly flowing into the application member 2. Accordingly, even with the coating material P containing a solid, that is, regardless of the type of the coating material P, the coating material P can be smoothly guided to the application member 2 by the upper peripheral groove 40 and can be smoothly ejected from the application member 2.

In addition, the upper peripheral groove 40 in the coating material feeder 4 is formed between the coating material discharge region 4*a* and the coating material guide region 4*b* and allows the hole portion 2*a* of the application member 2 and the coating material accommodating space of the coating material tank 3 to communicate with each other. Accordingly, the flow of the coating material P is not interrupted in the middle in the axial direction. As a result, even if the coating material P contains a solid, after the upper peripheral groove 40 suctions up the coating material P from the coating material accommodating space by the capillary force, the coating material P is capable of flowing into the application member 2 without the solid clogging the middle of the coating material feeder 4. As a result, the coating material P can be smoothly guided toward the application member 2 regardless of the type of the coating material.

In addition, since the upper peripheral groove 40 allows the hole portion 2*a* of the application member 2 and the coating material accommodating space of the coating material tank 3 to communicate with each other, the effect of the stirring member M stirring the coating material P can be easily transmitted to the application member 2, the fluidity of the coating material P can be improved, and the coating material P is capable of flowing smoothly.

In addition, the first groove 41 and the second groove 42 are formed as the upper peripheral groove 40. Accordingly, the groove width dimension in the feeder circumferential direction in each of the grooves 41 and 42 can be reduced. As a result, the capillary force in the upper peripheral groove 40 can be generated with ease, and the coating material P is capable of effectively flowing toward the application member 2. By providing the second groove 42 between the first grooves 41, the occupied area of the groove 40 in the coating material feeder 4 can be maximized, and the coating material P can be guided smoothly.

In addition, in the present embodiment, the coating material feeder 4 can be given a shape optimal for the flow of the coating material P by the maximum depth dimension L1 of the first groove 41 with respect to the maximum outer diameter dimension D of the coating material discharge region 4*a* being 25% or more and 40% or less or the ratio of the occupied area occupied by the upper peripheral groove 40 in the cross section orthogonal to the axial direction in the coating material discharge region 4*a* being 5% or more.

In addition, by the maximum groove width dimension W1 and the minimum groove width dimension W1*s* in each upper peripheral groove 40 being 0.05 mm or more and 0.18 mm or less, preferably 0.16 mm or less, the capillary force can be exerted sufficiently and a smooth flow can be achieved without the solid clogging the middle of the upper peripheral groove 40. In addition, it is possible to avoid the occurrence of a (so-called "ink drop") phenomenon in which the coating material P flows toward the front end side at once and air enters the coating material feeder 4, and it is also possible to avoid ink staying in the space S1 of the hole portion 2*a*.

In addition, in the present embodiment, the groove width dimension of the upper peripheral groove 40 changes in the feeder radial direction. Accordingly, the solid is capable of flowing with ease in the region where the groove width is relatively large, and the suction of the coating material P by the capillary force can be promoted in the region where the groove width is relatively small.

In addition, the connecting flow path F communicating with the upper peripheral groove 40 is formed in the main body cylinder portion 52 in the pressure fluctuation buffer member 5. By the upper peripheral groove 40 being formed, more coating material P is between the pressure fluctuation buffer member 5 and the coating material feeder 4, and yet the connecting flow path F is capable of improving the entry of the coating material P into the buffer space K and leakage of the coating material P can be avoided. In particular, since the connecting flow path F is provided separately from the first annular recess portion 54, air is moved between the buffer space K and the coating material accommodating space by the first annular recess portion 54, the coating material P is moved between the buffer space K and the upper peripheral groove 40 by the connecting flow path F, and leakage of the coating material P can be suppressed effectively.

In the embodiment described above, a lateral groove (not illustrated) may be further provided in the outer peripheral surface of the coating material feeder 4 to interconnect the upper peripheral grooves 40 that are adjacent to each other in the feeder circumferential direction. In other words, such a lateral groove intersects the upper peripheral groove 40 and extends in the feeder circumferential direction. With such a lateral groove, the coating material P can be transferred between the upper peripheral grooves 40 and the coating material P is capable of flowing toward the front end side more smoothly.

Second Embodiment

Figure 7:
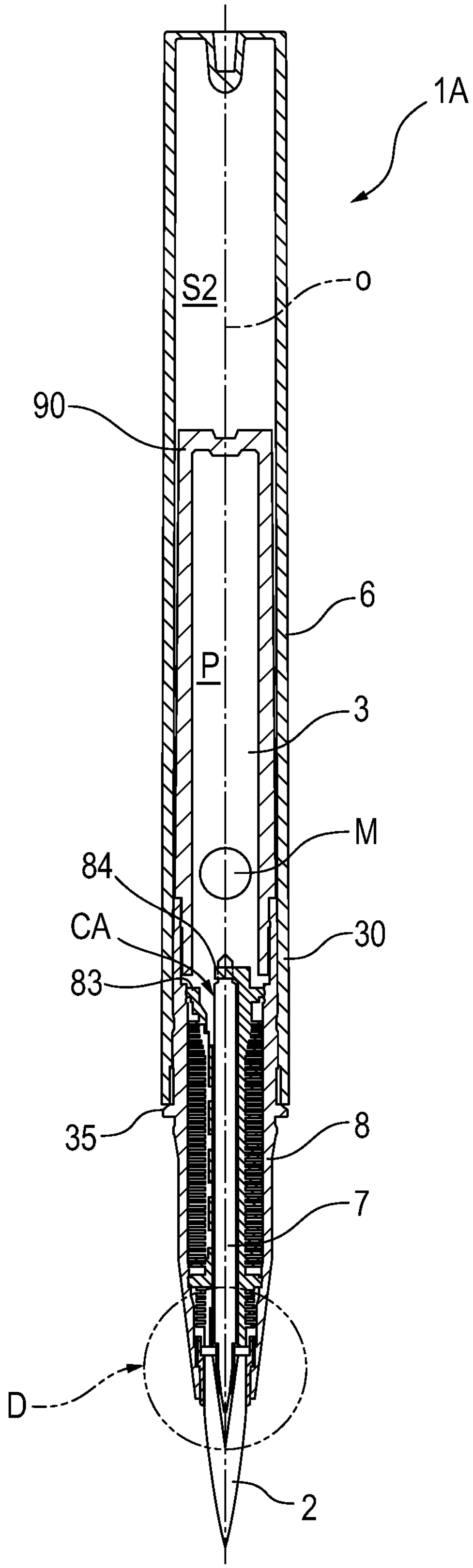
FIG. 7 is a vertical cross-sectional view of a direct liquid type pen-shaped eyeliner according to a second embodiment of the present invention.

Next, a direct liquid type pen-shaped eyeliner 1A according to a second embodiment of the present invention will be described with reference to FIGS. 7 to 9. In the second embodiment, the same components as those in the first embodiment are denoted by the same reference numerals, and detailed description thereof will be omitted. As illustrated in FIG. 7, in the second embodiment, a coating material feeder 7 and a pressure fluctuation buffer member 8 are different from those in the first embodiment.

(Coating Material Feeder)

Figure 8:
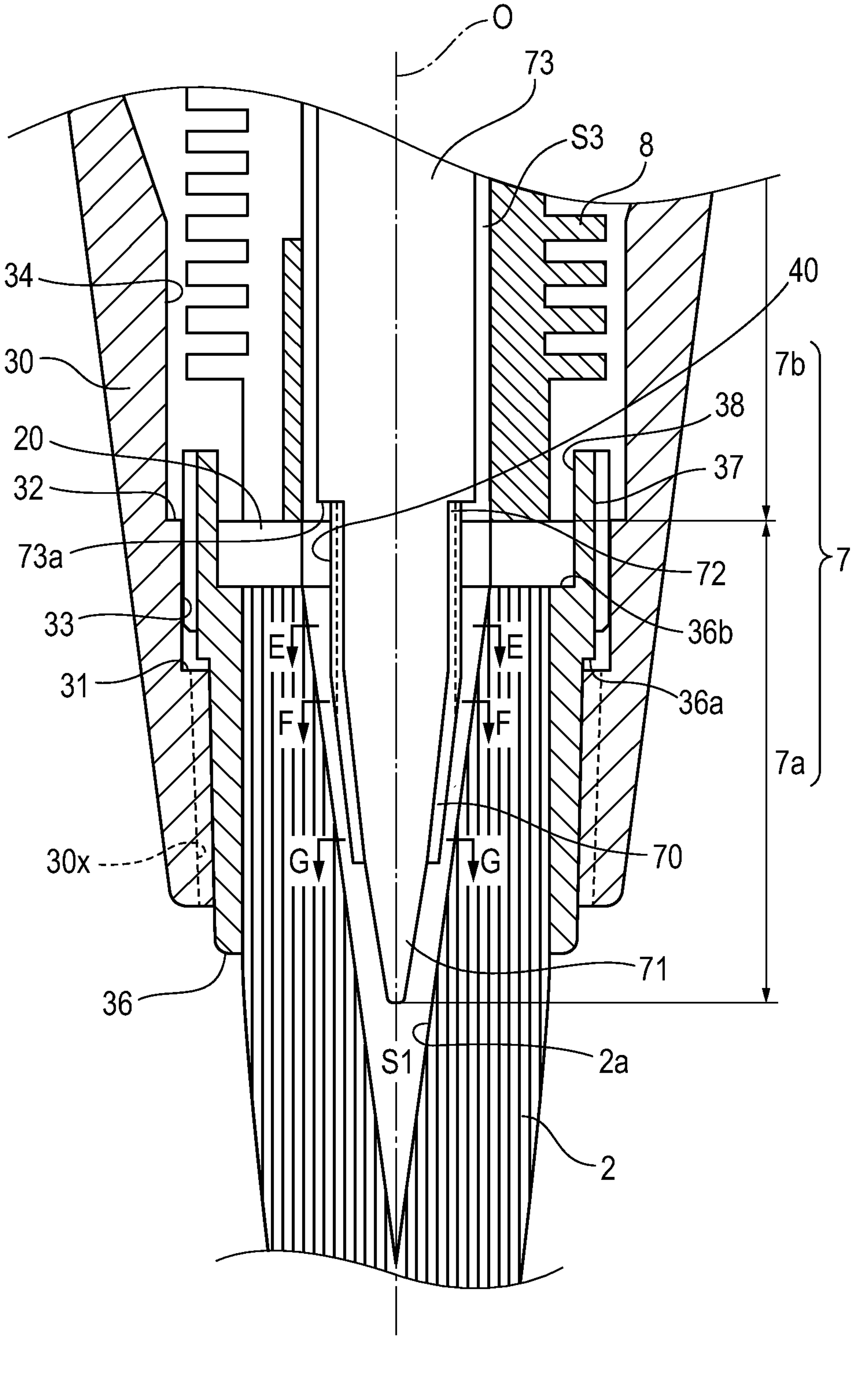
FIG. 8 is an enlarged view of a main part of the direct liquid type pen-shaped eyeliner and is a view illustrating the D part in FIG. 7.

As illustrated in FIG. 8, a coating material discharge region 7*a* in the coating material feeder 7 includes a tubular body 70 having a cylindrical shape centered on the axis O and extending in the axial direction and a discharge side relay core body 71 disposed in the tubular body 70.

The tubular body 70 is made of resin as in the case of the coating material discharge region 4*a* of the first embodiment. The tubular body 70 has a tapered shape in which the diameter gradually decreases from the intermediate position in the axial direction toward the front end side. The outer diameter of the tubular body 70 is smaller than the inner diameter of the hole portion 2*a* of the application member 2, and a space (clearance) where the coating material P is capable of flowing is formed between the outer peripheral surface of the tubular body 70 and the inner peripheral surface of the hole portion 2*a*. In a case where the application member 2 is a brush, a space (clearance) does not necessarily have to be formed between the outer peripheral surface of the tubular body 70 and the inner peripheral surface of the hole portion 2*a*.

Figure 9A:
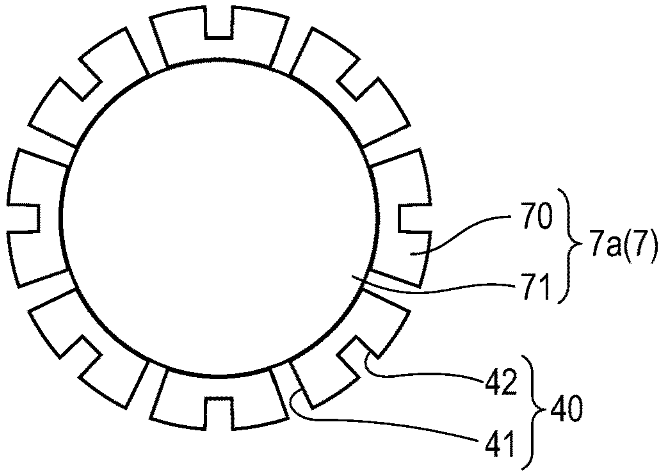
FIGS. 9A to 9C are lateral cross-sectional views of a coating material feeder in the direct liquid type pen-shaped eyeliner.
Figure 9B:
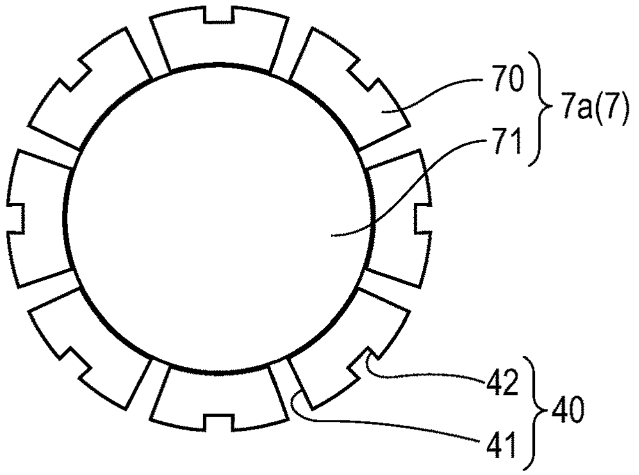
Figure 9C:
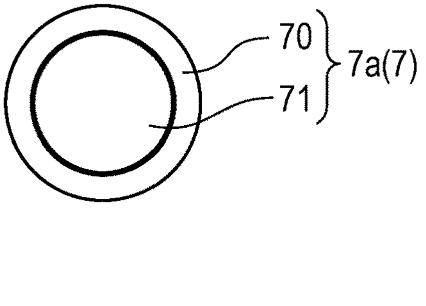

In addition, as illustrated in FIG. 9A, the plurality of upper peripheral grooves 40 (first grooves 41 and second grooves 42) are formed in the outer peripheral surface of the tubular body 70. As a result, the upper peripheral groove 40 faces the inner peripheral surface of the hole portion 2*a*. Further, only the first groove 41 of the upper peripheral groove 40 penetrates the tubular body 70 in the feeder radial direction and is open toward the outer peripheral surface of the discharge side relay core body 71, which will be described later. In addition, as illustrated in FIGS. 9A to 9C, the upper peripheral groove 40 extends from the end portion on the rear end side of the tubular body 70 to the region where the tubular body 70 has a tapered shape, and the upper peripheral groove 40 is not formed in the end portion on the front end side of the tubular body 70.

The discharge side relay core body 71 has a round bar shape centered on the axis O. The discharge side relay core body 71 is configured by converging, for example, polyester, nylon, or acrylic fibers. The discharge side relay core body 71 has a tapered shape in which the outer diameter gradually decreases from the intermediate position in the axial direction toward the front end side along the shape of the inner peripheral surface of the tubular body 70. In addition, the discharge side relay core body 71 protrudes from the tubular body 70 to the front end side and is along the inner peripheral surface of the tapered hole portion 2*a*. The space S1 is formed between the discharge side relay core body 71 and the inner peripheral surface of the hole portion 2*a*.

A coating material guide region 7*b* in the coating material feeder 7 has an extending cylinder body 72 formed integrally with the tubular body 70 and a guide side relay core body 73 formed integrally with the discharge side relay core body 71.

The extending cylinder body 72 is connected to the rear end side of the tubular body 70. Since the extending cylinder body 72 is formed integrally with the tubular body 70, the extending cylinder body 72 is a member made of the same resin as the tubular body 70 and the extending cylinder body 72 is formed to have the same diameter as the tubular body 70. The upper peripheral groove 40 is formed between the tubular body 70 and the extending cylinder body 72 and is open to the end surface on the rear end side of the extending cylinder body 72.

The guide side relay core body 73 is connected to the rear end side of the discharge side relay core body 71 and is inserted through the extending cylinder body 72 to form a rod shape. Since the guide side relay core body 73 is formed integrally with the discharge side relay core body 71, the guide side relay core body 73 is configured by converging the same fibers as the discharge side relay core body 71. The guide side relay core body 73 extends to the rear end side with the same diameter as the discharge side relay core body 71, and then the outer diameter increases with respect to the feeder radial direction. As a result, the guide side relay core body 73 has an annular end surface (abutting surface) 73*a* forming a circular ring shape centered on the axis O at the intermediate position in the axial direction. The annular end surface 73*a* is disposed at a position on the rear end side beyond the fixing layer 20. The extending cylinder body 72 abuts against the annular end surface 73*a* from the front end side. On the rear end side beyond the annular end surface 73*a*, the guide side relay core body 73 protrudes to the outside in the feeder radial direction beyond the extending cylinder body 72. The opening of the upper peripheral groove 40 faces the annular end surface 73*a*.

In addition, by the discharge side relay core body 71 being inserted through and loosely fitted to the pressure fluctuation buffer member 8, a flow space S3 capable of guiding the coating material P is formed at the boundary between the inner peripheral surface of the pressure fluctuation buffer member 8 and the outer peripheral surface of the guide side relay core body 73. By the annular end surface 73*a* being disposed on the rear end side beyond the fixing layer 20, the flow space S3 allows the upper peripheral groove 40 and the coating material accommodating space of the coating material tank 3 (see FIG. 7) to communicate with each other and allows the hole portion 2*a* and the coating material accommodating space of the coating material tank 3 to communicate with each other. The end portion on the rear end side of the guide side relay core body 73 is disposed in the coating material accommodating space of the coating material tank 3 (see FIG. 7).

Here, the loose fitting indicates a state where the coating material feeder 7 is inserted through the pressure fluctuation buffer member 8 such that the coating material feeder 7 is capable of moving with respect to the pressure fluctuation buffer member 8 when the coating material feeder 7 is pushed with a predetermined force.

Specifically, for example, in a case where the maximum outer diameter dimension of the coating material guide region 7*b* in the coating material feeder 7 measured by contour projection is defined as a and the inner diameter dimension of the pressure fluctuation buffer member 8 is defined asp, it is preferable to satisfy $\alpha<\beta+0.04$ mm. It is more preferable to satisfy $\alpha<\beta$. In addition, $\beta-0.25$ mm$\leq\alpha$ is more preferable.

Further, the coating material guide region 7*b* may be supported by the pressure fluctuation buffer member 8 in a state of being insertable without resistance into the pressure fluctuation buffer member with a force of 0.5 [N] or less.

(Pressure Fluctuation Buffer Member)

Returning to FIG. 7, in the pressure fluctuation buffer member 8 of the present embodiment, the shape of an extending portion 83 is different from that of the first embodiment. Specifically, a feeder support portion 84 is provided in the end portion on the rear end side of the extending portion 83. The feeder support portion 84 is provided so as to protrude from the inner peripheral surface of the extending portion 83 toward the inside in the feeder radial direction, that is, toward the axis O at a part in the feeder circumferential direction. The feeder support portion 84 is disposed in the coating material accommodating space of the coating material tank 3.

A through hole 84*a* extending in the axial direction is formed in the feeder support portion 84. The end portion on the rear end side of the coating material guide region 7*b* is fitted in the through hole 84*a*. The feeder support portion 84 supports the coating material guide region 7*b* in a state where the flow space S3 is formed between the inner peripheral surface of the pressure fluctuation buffer member 8 and the outer peripheral surface of the coating material guide region 7*b*.

Here, the front end side beyond the feeder support portion 84 and inside of the extending portion 83 is a contact region CA where a part of the outer peripheral surface of the coating material guide region 7*b* is in contact with the coating material P. In other words, the feeder support portion 84 is provided on the rear end side beyond the contact region CA.

In the present embodiment, a tail plug 90 of the coating material tank 3 has a bottomed cylindrical shape extending in the axial direction so as to form the outer peripheral and bottom walls of the coating material tank 3. The outer cylinder portion 30 and the tail plug 90 are engaged with each other in the end portion on the front end side of the coating material accommodating space to form the outer peripheral wall of the coating material tank 3, and yet the same tail plug 39 as in the first embodiment may be provided.

(Action and Effect)

Next, the action and effect of the direct liquid type pen-shaped eyeliner 1A will be described.

With the direct liquid type pen-shaped eyeliner 1A according to the present embodiment described above, the upper peripheral groove 40 faces the inner peripheral surface of the hole portion 2*a* in the hole portion 2*a* of the application member 2. Accordingly, the coating material P can be exuded from the inside of the upper peripheral groove 40 toward the outside in the feeder radial direction toward the inner peripheral surface of the hole portion 2*a* in the hole portion 2*a*. As a result, the coating material P guided into the upper peripheral groove 40 from the front end side by the coating material guide region 7*b* in the coating material feeder 7 can be diffused from the coating material discharge region 7*a* in the coating material feeder 7 toward the application member 2, and the coating material P is capable of smoothly flowing into the application member 2. Accordingly, even with the coating material P containing a solid, that is, regardless of the type of the coating material P, the coating material P can be smoothly guided to the application member 2 by the upper peripheral groove 40 and can be smoothly ejected from the application member 2.

Further, in the present embodiment, the opening of the upper peripheral groove 40 faces the annular end surface 73*a* of the coating material guide region 7*b*. Accordingly, the coating material P in the coating material accommodating space of the coating material tank 3 is capable of flowing into the upper peripheral groove 40 after being suctioned up by the capillary force into the guide side relay core body 73 of the coating material guide region 7*b*.

Further, the guide side relay core body 73 of the coating material guide region 7*b* is loosely fitted to the pressure fluctuation buffer member 8. Accordingly, the flow space S3 capable of guiding the coating material P is formed between the coating material guide region 7*b* and the pressure fluctuation buffer member 8. In addition, the flow space S3 communicates with the inside of the hole portion 2*a*. Accordingly, in a case where the coating material P contains a solid, the coating material P is capable of flowing from the coating material accommodating space through the flow space S3 and flowing into the hole portion 2*a* together with the solid. Accordingly, even in a case where the coating material P contains a solid, the coating material P is capable of flowing into the application member 2 without the solid clogging the middle of the coating material feeder 7. As a result, the coating material P can be smoothly guided toward the application member 2 regardless of the type of the coating material P.

Further, the first groove 41 of the upper peripheral groove 40 penetrates the coating material discharge region 7*a* in the feeder radial direction and is open toward the discharge side relay core body 71. As a result, the coating material P that has flowed into the discharge side relay core body 71 from the guide side relay core body 73 of the coating material guide region 7*b* is also diffused to the outside in the feeder radial direction toward the application member 2 through the first groove 41, and the coating material P is capable of flowing into the application member 2.

In addition, the upper peripheral groove 40 extends in the axial direction. As a result, the upper peripheral groove 40 faces the hole portion 2*a* in a wide range in the axial direction, and more coating material P can be diffused toward the application member 2 and the coating material P is capable of smoothly flowing into the application member 2. Further, since the upper peripheral groove 40 extends in the axial direction and is continuous in the axial direction from the flow space S3, the coating material P can be guided straight in the axial direction from the coating material accommodating space of the coating material tank 3 and the coating material P is capable of smoothly flowing into the application member 2.

In addition, the discharge side relay core body 71 of the coating material discharge region 7*a* protrudes from the tubular body 70, is disposed outside the tubular body 70, and follows the shape of the inner surface of the hole portion 2*a*. Accordingly, the coating material P can be exuded to the outside in the feeder radial direction toward the inner peripheral surface of the hole portion 2*a* from the end portion on the front end side of the discharge side relay core body 71 as well, and the coating material P can be smoothly guided to the application member 2 from the coating material accommodating space of the coating material tank 3.

In the present embodiment, in a case where the coating material P does not contain a solid, the coating material guide region 7*b* may be fitted to the pressure fluctuation buffer member 8 without necessarily having to be loosely fitted to the pressure fluctuation buffer member 8. In other words, with at least the upper peripheral groove 40 formed so as to penetrate the coating material discharge region 7*a* in the feeder radial direction, the coating material P that has soaked into the coating material guide region 7*b* can be diffused toward the application member 2 through the upper peripheral groove 40, and thus the flow space S3 may not be formed. On the other hand, in a case where the coating material P contains a solid, it is preferable that the flow space S3 is formed. In addition, the upper peripheral groove 40 may be, for example, a lateral groove forming a circular ring shape extending in the circumferential direction or may be spirally formed around the axis O, and at least the upper peripheral groove 40 may be formed so as to penetrate the coating material discharge region 7*a* in the feeder radial direction.

Modification Example

Figure 10:
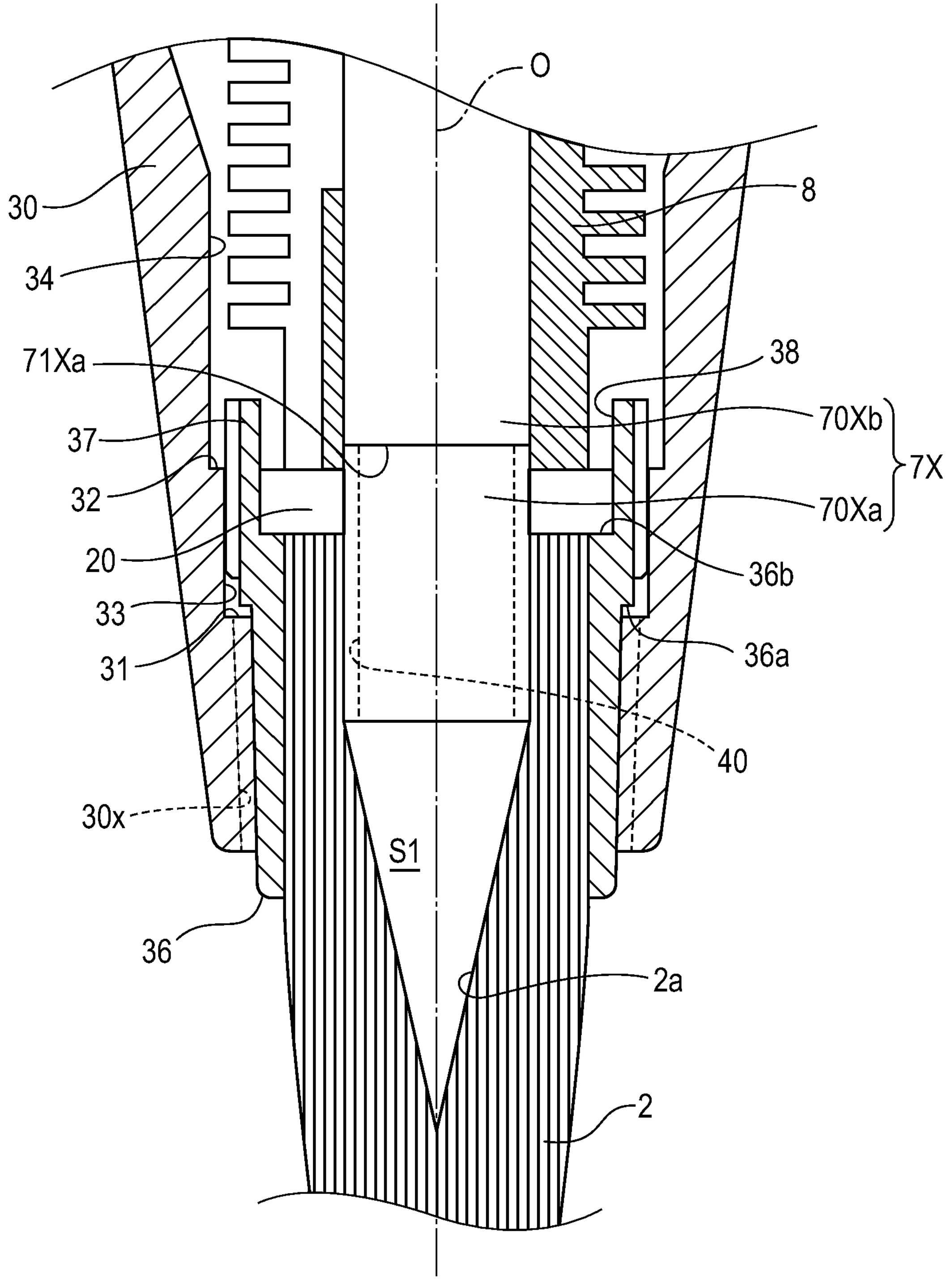
FIG. 10 is a vertical cross-sectional view illustrating a coating material feeder of a direct liquid type pen-shaped eyeliner according to a modification example of the second embodiment of the present invention.

As illustrated in FIG. 10, in a coating material feeder 7X of the second embodiment described above, a coating material discharge region 7Xa made of resin and a coating material guide region 7Xb as a relay core may both form a round bar shape extending in the axial direction. In other words, the coating material discharge region 7Xa may be in the state of a rod made of resin and the coating material guide region 7Xb may be a relay core body configured by converging the above fibers. Further, the end surface on the front end side in the coating material guide region 7Xb may abut against an end surface (abutting surface) 71Xa on the rear end side of the coating material discharge region 7Xa. The upper peripheral groove 40 is open toward the abutting surface 71Xa. Also in this case, the coating material P flows from the coating material guide region 7Xb into the upper peripheral groove 40 of the coating material discharge region 7Xa, and the coating material P can be exuded from the inside of the upper peripheral groove 40 to the outside in the feeder radial direction and diffused to the application member 2. In addition, in this case, the coating material guide region 7Xb may be loosely fitted or fitted to the pressure fluctuation buffer member 8.

Third Embodiment

Figure 11:
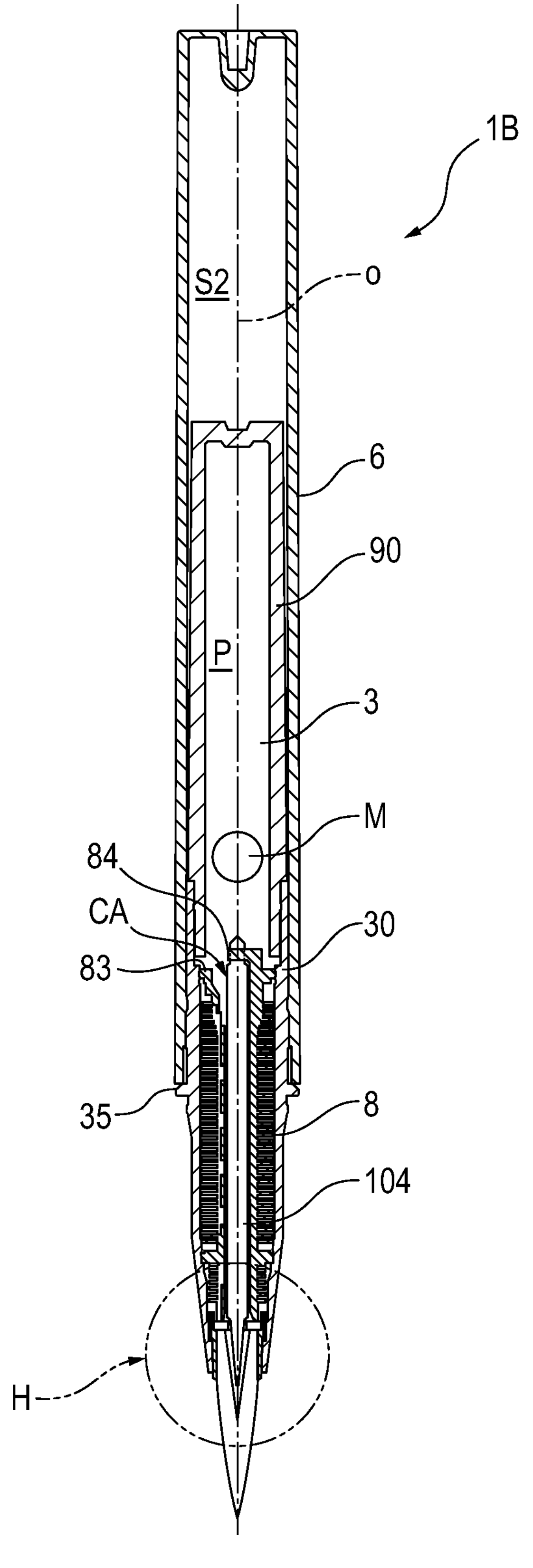
FIG. 11 is a vertical cross-sectional view of a direct liquid type pen-shaped eyeliner according to a third embodiment of the present invention.

Next, a direct liquid type pen-shaped eyeliner 1B according to a third embodiment of the present invention will be described with reference to FIGS. 11 and 12. In the third embodiment, the same components as those in the first embodiment and the second embodiment are denoted by the same reference numerals, and detailed description thereof will be omitted. As illustrated in FIG. 11, in the third embodiment, a coating material feeder 104 is different from that of the embodiments described above.

(Coating Material Feeder)

Figure 12:
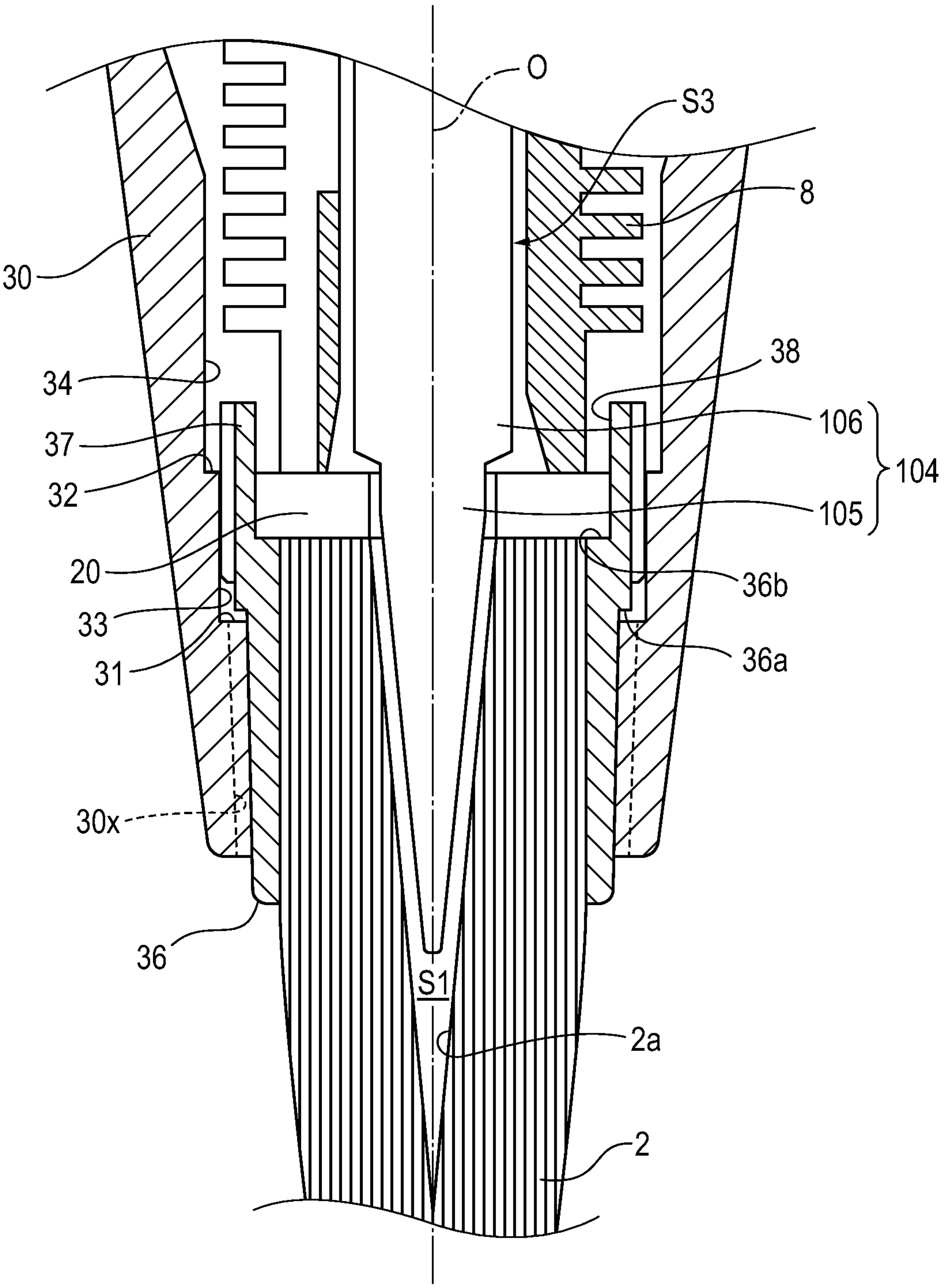
FIG. 12 is an enlarged view of a main part of the direct liquid type pen-shaped eyeliner and is a view illustrating the H part in FIG. 11.

As illustrated in FIG. 12, the coating material feeder 104 is a relay core body configured by converging the above fibers and is inserted through and loosely fitted to the pressure fluctuation buffer member 8. Here, as described in the second embodiment, the loose fitting indicates a state where the coating material feeder 104 is inserted through the pressure fluctuation buffer member 8 such that the coating material feeder 104 is capable of moving with respect to the pressure fluctuation buffer member 8 when the coating material feeder 104 is pressed with a predetermined force. Further, as in the second embodiment, by the feeder support portion 84 of the pressure fluctuation buffer member 8, the flow space S3 allowing the hole portion 2*a* and the coating material accommodating space of the coating material tank 3 to communicate with each other and capable of guiding the coating material P is formed at the boundary between the inner peripheral surface of the pressure fluctuation buffer member 8 and the outer peripheral surface of the coating material feeder 104. In the present embodiment, the coating material feeder 104 has a small diameter portion 105 having a part disposed in the hole portion 2*a* and a large diameter portion 106 larger in outer diameter than the small diameter portion 105, provided on the rear end side beyond the small diameter portion 105, and inserted through the pressure fluctuation buffer member 8. The boundary between the small diameter portion 105 and the large diameter portion 106 is positioned on the rear end side beyond the fixing layer 20.

Here, as in the second embodiment, a space (clearance) where the coating material P is capable of flowing is formed between the outer peripheral surface of the coating material feeder 104 and the inner peripheral surface of the hole portion 2*a*. In a case where the application member 2 is a brush, a space (clearance) does not necessarily have to be formed between the outer peripheral surface of the coating material feeder 104 and the inner peripheral surface of the hole portion 2*a*.

(Action and Effect)

Next, the action and effect of the direct liquid type pen-shaped eyeliner will be described.

With the direct liquid type pen-shaped eyeliner according to the present embodiment described above, the coating material feeder 104 is loosely fitted to the pressure fluctuation buffer member 8, and the flow space S3 capable of guiding the coating material P is formed between the inner peripheral surface of the pressure fluctuation buffer member 8 and the outer peripheral surface of the coating material feeder 104. The flow space S3 allows the coating material accommodating space of the coating material tank 3 and the hole portion 2*a* to communicate with each other. Accordingly, even in a case where the coating material contains a solid, the coating material is capable of flowing from the coating material accommodating space through the flow space S3 and flowing into the hole portion 2*a*. Accordingly, the coating material P is capable of flowing into the application member 2 without the solid in the coating material clogging the middle of the coating material feeder 104. As a result, the coating material can be smoothly guided toward the application member 2 and ejected from the application member 2 regardless of the type of the coating material P.

The present invention is not limited to the embodiments described above, and it is a matter of course that various modifications can be made without departing from the gist of the present invention.

For example, the application member 2, the coating material tank 3, the coating material feeder 4 (7, 7X, 104), the pressure fluctuation buffer member 5 (8), and the outer case 6 do not necessarily have to be provided coaxially.

INDUSTRIAL APPLICABILITY

With the direct liquid type pen-shaped eyeliner of the present invention, a coating material can be guided and ejected smoothly.

REFERENCE SIGNS LIST

1, 1A, 1B: direct liquid type pen-shaped eyeliner
2: application member
2*a*: hole portion
3: coating material tank
4, 7, 7X, 104: coating material feeder
4*a*, 7*a*, 7Xa: coating material discharge region
4*b*, 7*b*, 7Xb: coating material guide region
5, 8: pressure fluctuation buffer member
40: upper peripheral groove
41: first groove
42: second groove
P: coating material
S3: flow space

What is claimed is:

1. A direct liquid type pen-shaped eyeliner forming a rod shape, guiding a coating material toward a front end side from a rear end side in a longitudinal direction, and ejecting the coating material from the front end side, the direct liquid type pen-shaped eyeliner comprising:
- a coating material tank where a coating material accommodating space accommodating the coating material is formed;
- an application member having a hole portion recessed from an end surface on the rear end side toward the front end side and ejecting the coating material;
- a coating material feeder forming a rod shape extending in the longitudinal direction, inserted into the hole portion from the rear end side, extending into the coating material accommodating space, and supplying the coating material in the coating material tank to the application member; and
- a pressure fluctuation buffer member forming a tubular shape extending in the longitudinal direction, disposed on an outer peripheral side of the coating material feeder, forming a buffer space connected to the coating material accommodating space inside, and buffering a pressure fluctuation in the coating material accommodating space by flow of the coating material and air between the coating material accommodating space and the buffer space, wherein
- the coating material feeder includes:
- a coating material discharge region positioned in the hole portion; and
- a coating material guide region positioned outside the hole portion and guiding the coating material in the coating material tank toward the coating material discharge region,
- an upper peripheral groove recessed from an outer peripheral surface toward an inside in a feeder radial direction as a radial direction of the coating material feeder, facing an inner peripheral surface of the hole portion, and allowing the coating material to flow in is formed of resin in the coating material discharge region,
- the upper peripheral groove extends in the longitudinal direction and a plurality of the upper peripheral grooves are formed at intervals in a feeder circumferential direction as a circumferential direction of the coating material feeder, and
- a lateral groove interconnecting the upper peripheral grooves adjacent to each other in the feeder circumferential direction and intersecting the upper peripheral grooves is further formed in the coating material feeder.

2. The direct liquid type pen-shaped eyeliner according to claim 1, wherein a maximum groove width dimension in the feeder circumferential direction in the upper peripheral groove is 0.05 mm or more and 0.18 mm or less.

3. The direct liquid type pen-shaped eyeliner according to claim 1, wherein a ratio of a maximum depth dimension in the feeder radial direction in the upper peripheral groove to a maximum outer diameter dimension of the coating material discharge region is 25% or more and 40% or less.

4. The direct liquid type pen-shaped eyeliner according to claim 1, wherein a ratio of an occupied area occupied by the upper peripheral groove in a cross section orthogonal to the longitudinal direction in the coating material discharge region is 5% or more.

5. A direct liquid type pen-shaped applicator forming a rod shape, guiding a coating material toward a front end side from a rear end side in a longitudinal direction, and ejecting the coating material from the front end side, the direct liquid type pen-shaped eyeliner comprising:
- a coating material tank where a coating material accommodating space accommodating the coating material is formed;
- an application member having a hole portion recessed from an end surface on the rear end side toward the front end side and ejecting the coating material;
- a coating material feeder forming a rod shape extending in the longitudinal direction, inserted into the hole portion from the rear end side, extending into the coating material accommodating space, and supplying the coating material in the coating material tank to the application member; and
- a pressure fluctuation buffer member forming a tubular shape extending in the longitudinal direction, disposed on an outer peripheral side of the coating material feeder, forming a buffer space connected to the coating material accommodating space inside, and buffering a pressure fluctuation in the coating material accommodating space by flow of the coating material and air between the coating material accommodating space and the buffer space, wherein
- the coating material feeder includes:
- a coating material discharge region positioned in the hole portion; and a coating material guide region positioned outside the hole portion and guiding the coating material in the coating material tank toward the coating material discharge region, an upper peripheral groove recessed from an outer peripheral surface toward an inside in a feeder radial direction as a radial direction of the coating material feeder, facing an inner peripheral surface of the hole portion, and allowing the coating material to flow in is formed of resin in the coating material discharge region, the coating material discharge region has:

a tubular body extending in the longitudinal direction, forming a tubular shape, and formed of resin; and a discharge side relay core body disposed in the tubular body and configured by converging a fiber, and the upper peripheral groove is formed in the tubular body.

6. The direct liquid type pen-shaped eyeliner according to claim 5, wherein the coating material of the discharge side relay core body is dischargeable to the application member via the upper peripheral groove by the upper peripheral groove penetrating the tubular body in the feeder radial direction.

7. The direct liquid type pen-shaped eyeliner according to claim 5, wherein the hole portion has a shape with an inner diameter gradually decreasing toward the front end side, and the discharge side relay core body protrudes from the tubular body to the front end side and has an outer diameter gradually decreasing toward the front end side along the shape of the hole portion.

8. The direct liquid type pen-shaped eyeliner according to claim 5, wherein the coating material guide region has a rod-shaped guide side relay core body configured by converging a fiber, and the guide side relay core body and the discharge side relay core body are integrated.

9. The direct liquid type pen-shaped eyeliner according to claim 5, wherein the coating material discharge region is a rod-shaped body extending in the longitudinal direction, forming a rod shape, and formed of resin, the coating material guide region is a rod-shaped relay core body configured by converging a fiber, a front end side in the relay core body has an abutting surface abutting against an end surface on a rear end side of the rod-shaped body from the rear end side and the rear end side in the relay core body is disposed in the coating material accommodating space, and a rear end side of the upper peripheral groove formed in an outer peripheral surface of the rod-shaped body is open toward the abutting surface.

* * * * *